United States Patent [19]

Gray

[11] Patent Number: 4,738,833
[45] Date of Patent: Apr. 19, 1988

[54] SELF-REGULATING DOSING DISPENSER

[76] Inventor: James R. Gray, 8816 Westwood, Little Rock, Ark. 72204

[21] Appl. No.: 874,086

[22] Filed: Jun. 13, 1986

[51] Int. Cl.$^4$ .......................... B01D 11/02; E03D 9/03
[52] U.S. Cl. .................................... 422/266; 422/277; 4/223; 4/231
[58] Field of Search ............... 422/265, 266, 276, 277; 4/223, 224, 227, 228, 231; 222/56, 57; 137/268

[56] References Cited

U.S. PATENT DOCUMENTS

| | | | |
|---|---|---|---|
| 2,802,724 | 8/1957 | Johnson | 137/268 |
| 2,874,032 | 2/1959 | Kuehner | 137/268 |
| 4,181,702 | 1/1980 | Watson | 422/265 |
| 4,212,089 | 7/1980 | Lindauer | 4/227 |
| 4,375,109 | 3/1983 | Jones | 4/227 |

Primary Examiner—David L. Lacey
Attorney, Agent, or Firm—Spencer & Frank

[57] ABSTRACT

A toilet bowl cleaner dispenser which automatically increases or decreases its liquid volume output respectively in response to an increase or decrease in the concentration of cleaning material dissolved in a liquid solution in a dispenser reservoir, and a method of manufacture thereof. The dispenser, which may be fixed in a toilet tank at a designated position relative to the quiescent water level in the tank, includes an enclosure having an internal cavity containing a solid block of water soluble cleaning agent, the cavity being sealed except for an upper air vent and a lower water inflow and solution outflow opening. The air vent communicates with the exterior of the dispenser through an air inflow and outflow passage having an air opening at a vertical level between the upper air vent and the lower opening. The lower opening communicates with the exterior of the dispenser through a passage having a liquid opening at a vertical level between the air opening and the lower opening. With this structure, the desired volume of solution dispensed at each flush is obtained as a result of changes in the specific gravity of the solution reflecting changes in concentration of the cleaning material therein and causing a corresponding change in the level of the solution in the dispenser. In accordance with one method and structure of the invention, the dispenser is formed from a flexible rectangular sheet having holes prepunched therein and which is formed and sealed using heating techniques.

11 Claims, 4 Drawing Sheets

FIG. 4.
FIG. 5.
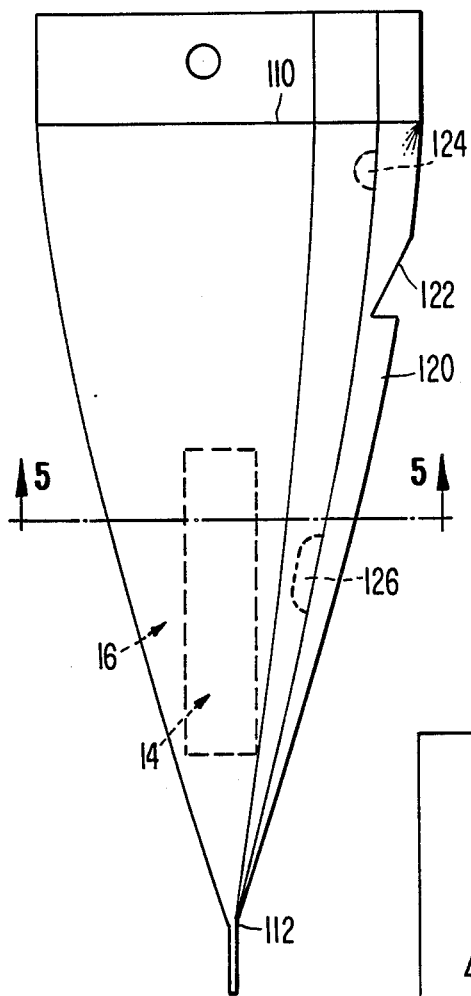
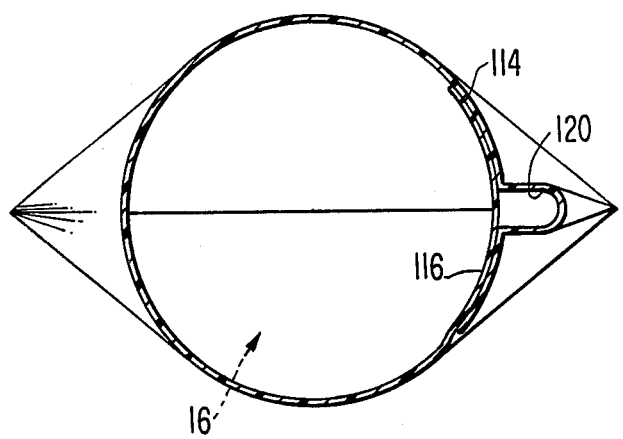
FIG. 6.
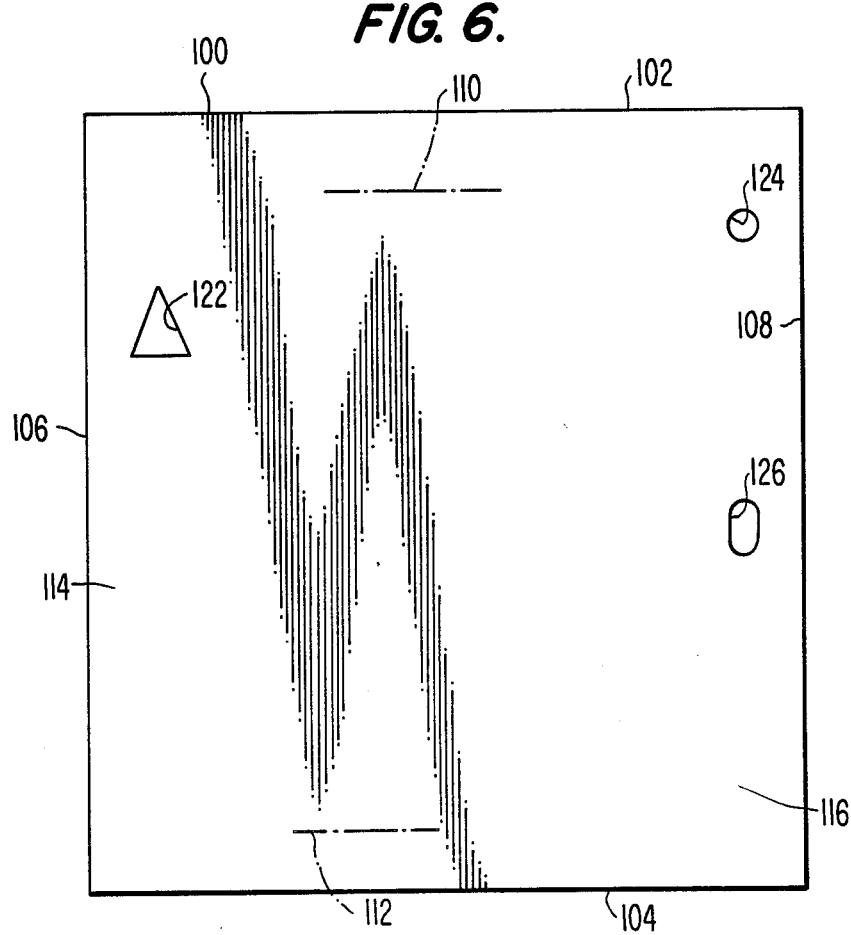

FIG. 7.
FIG. 8.
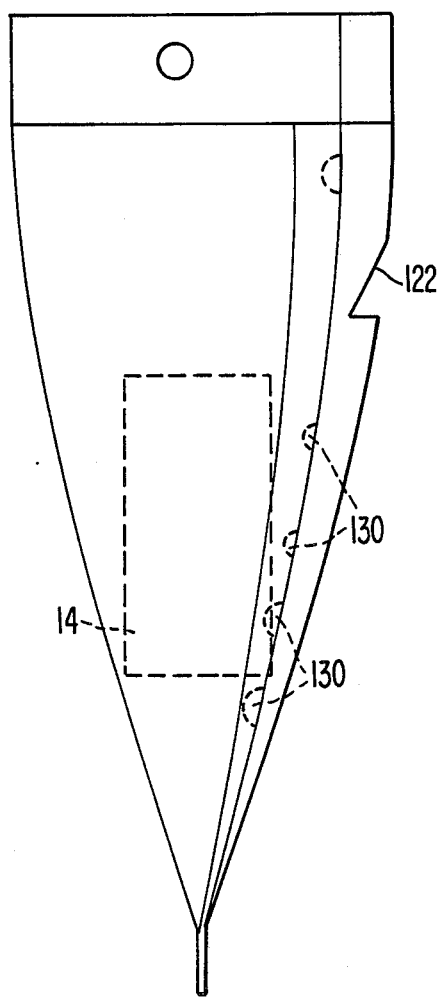
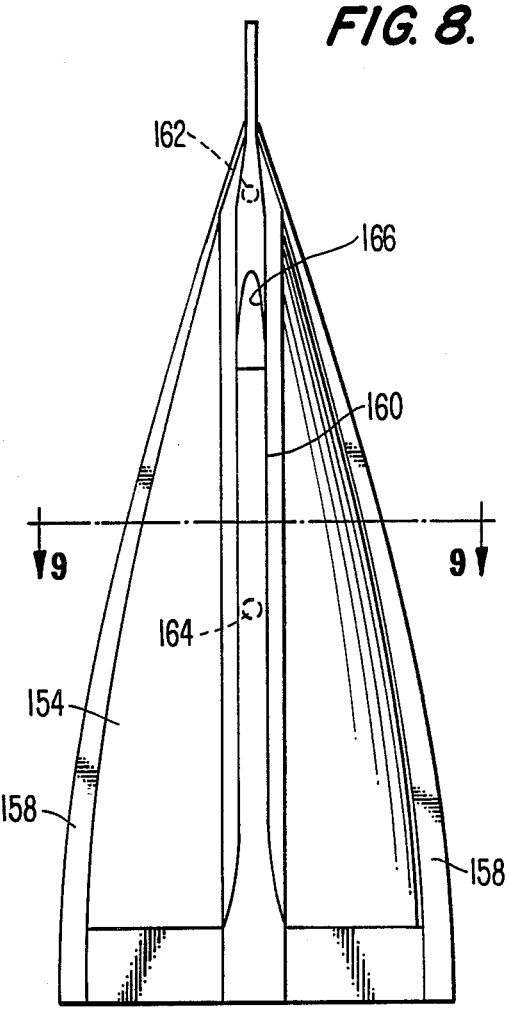
FIG. 9.
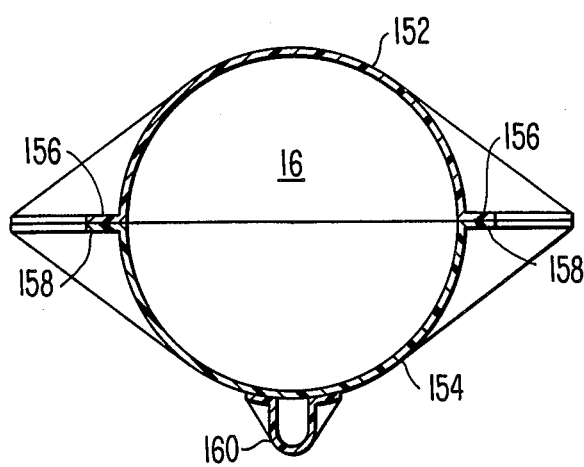

SELF-REGULATING DOSING DISPENSER

BACKGROUND OF THE INVENTION

1. Field of the Invention

This invention relates to an automatic toilet bowl cleaner dispenser, and more particularly to a low cost automatic toilet bowl cleaning agent dispenser which self-regulates its cleaning agent output with reference to the concentration strength of a cleaning agent solution contained inside the dispenser, and to a method of manufacture thereof.

2. Prior Art

Current automatic toilet bowl cleaner dispensers are basically flexible, or rigid, containers containing a concentrated, solid cleaning agent material. Such dispensers are mounted to the toilet tank, submerged to some point beneath the tank water line. With some such dispensers a dose volume of tank water is allowed to enter the container between flush cycles, absorb some of the solid cleaning agent, and is then emitted into the tank (and ultimately into the bowl) during the next flush.

Examples of solid cleaning agents popular for this type of dispenser are concentrated chlorine materials such as calcium hypochlorite or one of the chlorinated isocyanurates, and also various surfactant/blue dye mixtures. U.S. Pat. No. 4,200,606 (Kitko) discloses examples of such solid cleaning agents.

Regardless of the cleaning agent used, there is an optimum concentration level for the cleaning agent to the toilet bowl water. Effective cleaning action does not occur below this optimum level, and cleaning material is simplY wasted when used above this optimum level.

Producers of current automatic toilet bowl cleaning agent dispensers recognize this fact, and have attempted to regulate cleaner output by constructing dispensers to emit a uniform volume of the concentrated water/cleaning agent solution contained inside the unit with each flush. Examples of such prior dispensers of the rigid body type are disclosed in U.S. Pat. Nos. 3,121,236 (Yadro), 3,618,143 (Hill), and 4,186,856 (Dirsking). Similar dispensers of the flexible body type are disclosed in U.S. Pat. Nos. 2,807,807 (Harper), 3,545,014 (Davis), and 3,869,069 (Levey).

However, a dispenser designed to emit a uniform amount of liquid with each flush of the toilet does not provide an optimum, or even uniform, output of cleaning agent with each flush. The concentration of solid cleaning agent dissolved into the water solution inside the dispenser at any given time is dramatically dependent upon the time the cleaning agent has been in contact with the water, how often and how much fresh water is added to the dispenser with each flush of the toilet, and the speed at which the cleaning agent can reach its maximum saturation point in the water under the temperature conditions present.

Current toilet bowl cleaning agent dispenser structures cannot address these factors. As a result, under the varying conditions found in use, their actual cleaning agent output levels are too high or too low as often as they are proper even though their liquid volume output is uniform. As a result, the dispenser user pays for too little cleaning part of the time, efficient cleaning part of the time, and too much cleaning part of the time.

This effect may be readily seen by examining the operation of a uniform liquid output dispenser containing a solid chlorine cleaning agent such as calcium hypochlorite. Calcium hypochlorite releases chlorine (hypochlorite ions) into the cleaning solution to produce an oxidizing action which chemically breaks down stains and soils on the toilet bowl surface. The optimum cleaning level of chlorine in the toilet bowl water is 2 to 7 parts per million for all chlorine cleaning agents. A typical conventional uniform liquid output cleaning agent having a dispenser designed for 30 days use (350 flushes) has a dispenser reservoir for 100 ml of water and a 1½ oz. block of calcium hypochlorite, with the liquid output level set for a uniform 10 ml with each flush of the toilet.

The nonuniformity of cleaning agent dispensing over the life of such a dispenser is evident from a consideration of FIG. 1 which effectively shows the saturation time curve for calcium hypochlorite in 100 ml of water. At 70° F., approximately 56 hours are required for the solution to reach a point where the molar fraction of chlorine (hypochlorite) to the water is as high as possible (a point where the water will not absorb additional chlorine). At this saturation point, 10 ml of the solution emitted into the 4½ gallons of water in a standard toilet tank will produce a 70 ppm chlorine level as shown in FIG. 1.

With a typical use of the toilet of 12 flushes per day, the minimum effective concentration of 2 ppm chlorine would be reached within two hours of initial placement of the dispenser in a toilet tank. However, with this use the concentration would reach about 40 ppm chlorine and then gradually diminish to zero as the chlorine is used up. This results in gross overuse of the chlorine during a substantial period and insufficient use or waste of the material at the end of the use period. If the dose is reduced to reduce the maximum concentration, insufficient concentrations will be obtained for a longer period initially and at the end of the use period.

Other conventional toilet bowl cleaning agent dispensers empty their entire volumes of solution into the tank each time the toilet is flushed. Such dispensers therefore restart the saturation time curve after each flush. Thus, any time the dispenser sits for several hours or days the chlorine output for the first flush is equivalent to that required for 20 or 30 flushes, and if two or more flushes are made during a short interval (e.g. ½ hour) those flushes following the first flush would produce far below the minimum effective 2 ppm chlorine in the toilet.

SUMMARY OF THE INVENTION

It is, therefore, an object of the present invention to provide a toilet bowl cleaning agent dispenser which dispenses an approximately uniform quantity of cleaning agent (as opposed to a uniform volume of liquid) to the toilet each time the toilet is flushed until substantially all of the cleaning agent is used up, and with greater independence of the frequency and timing of flushes than prior dispensers.

It is another object of the invention to provide such a dispenser which may be inexpensively produced.

It is still another object of the invention to provide an inexpensive method of automated manufacture of such a dispenser.

In accordance with the invention and in order to meet the above objects thereof, there is provided a toilet bowl cleaning agent dispenser which automatically increases or decreases its liquid volume output respectively in response to an increase or decrease in the concentration of cleaning agent dissolved in the liquid solution in the dispenser reservoir. This feature allows the output level of cleaning agent upon each flush of the toilet to be maintained relatively constant through the product life, regardless of the pattern or variation of use.

In accordance with the invention, the dispenser, which may be fixed in a toilet tank at a designated position relative to the quiescent water level in the tank, includes an enclosure having an internal cavity containing a solid block of water soluble cleaning agent, the cavity being sealed except for an upper air vent and a lower water inflow and solution outflow opening. The upper air vent communicates with the exterior of the dispenser through an air flow conduit having an air opening at a vertical level between the upper air vent and the lower opening. The lower opening communicates with the exterior of the dispenser through a liquid flow conduit having a liquid opening at a vertical level between the air opening and the lower opening.

By placing the dispenser in the tank with the quiescent water level above the air opening, water flows into the cavity through the liquid flow conduit and air is pushed out through the air flow conduit until the water in the cavity reaches the level of the air opening where it stops since the water in the cavity at this level and the air pressure thereabove and in the air flow conduit will then be substantially equal to the water pressure in the tank at the level of the air opening. The water in the cavity immediately begins to dissolve some of the solid cleaning agent in the cavity.

When the toilet is flushed, and the water level in the tank drops from above the air opening to below the liquid opening, the solution of water and cleaning agent flows from the cavity into the tank through the liquid flow conduit until the level of solution in the cavity drops to the level of the bottom of the liquid opening. The level of solution will again rise when the level of water in the tank again rises above the air opening at the end of the flush cycle.

Water in the cavity continues to dissolve more of the solid cleaning agent during quiescent and flushing periods so long as this water is not saturated with the cleaning agent. The cleaning agent, such as calcium hypochlorite, as it dissolves typically increases the specific gravity of the solution in proportion to the increased concentration of the cleaning agent in the solution. As the specific gravity of the solution increases, relatively more tank water head pressure is required to raise the solution in the cavity a given amount. Therefore, as the concentration of cleaning agent in the solution increases, the level to which it is raised or held is lowered increasing amounts below the level of the air opening and thus the volume of solution which flows from the cavity into the tank when the toilet is flushed (a volume equal to the volume of solution above the bottom of the liquid opening) is decreased. This decrease is roughly in proportion to the increase in cleaning agent concentration therein since the increase in concentration is reflected in a proportional increase in specific gravity and corresponding drop in the level of solution in the cavity. Thus, by proper selection of the dimensions of the dispenser and vertical distances between the air and liquid openings in relation to the particular solid cleaning agent being used, the volume of solution dispensed upon each flush can be maintained roughly inversely proportional to the cleaning agent concentration therein so that the cleaning agent output is maintained roughly constant.

In the preferred embodiments, the dispenser is formed from one or more sheets of flexible plastic, prepunched with suitably placed holes and appropriately rolled, pinched and sealed by automated machinery. The dispenser can therefore be inexpensively produced with totally automated machinery and provide a uniform dispensing of cleaning agent, irrespective of the pattern of use.

BRIEF DESCRIPTION OF THE DRAWINGS

These and other aspects of the invention will be better understood from the following detailed description of the preferred embodiments when taken with the accompanying drawings in which:

FIG. 4 an elevational view of the dosing dispenser of FIG. 3;

FIG. 5 is a cross-sectional view taken along the lines 5—5 in FIG. 4;

FIG. 6 illustrates a prepunched sheet from which the embodiment illustrated in FIGS. 3-5 may be formed in accordance with one embodiment of a method of manufacture in accordance with the invention;

FIG. 7 is an elevational view of a second structural embodiment of the invention;

FIG. 8 is an elevational view of a third structural embodiment of the invention;

FIG. 9 is a cross-sectional view taken along lines 9—9 in FIG. 8;

DETAILED DESCRIPTION OF THE PREFERRED EMBODIMENTS

Figure 1:
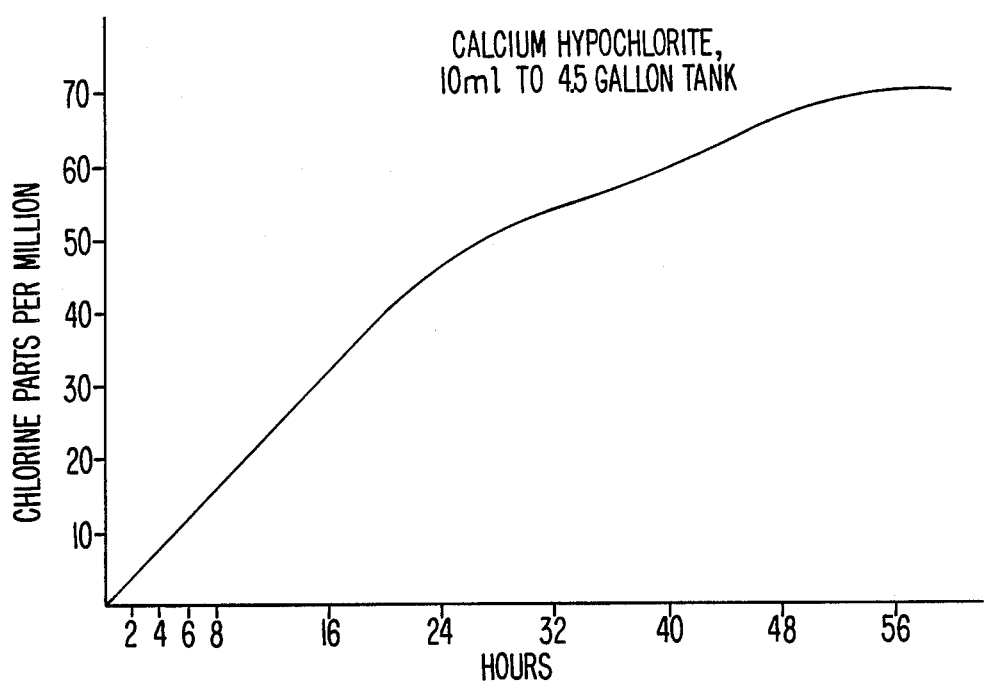
FIG. 1 is a saturation curve for a soluble cleaning material which may be used in accordance with the present invention.
Figure 2:
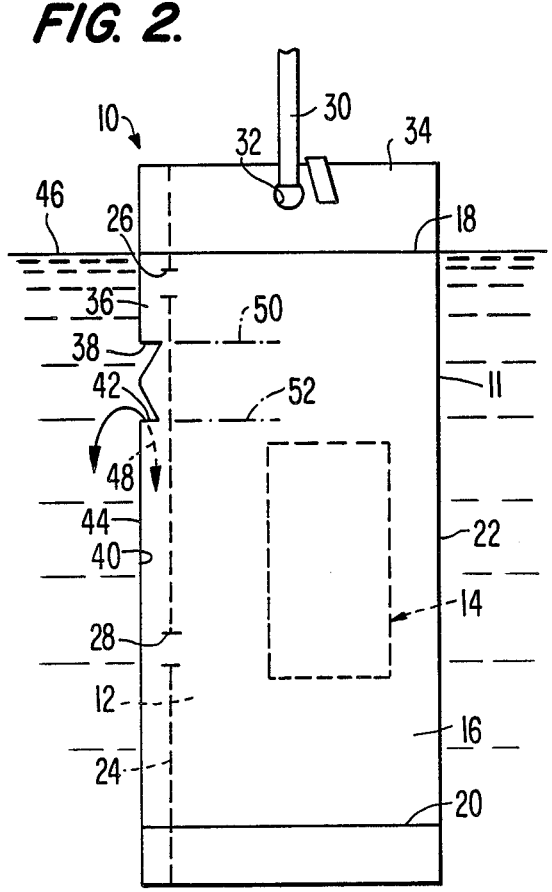
FIG. 2 is a schematic drawing of a dosing dispenser in accordance with the present invention.

Referring to FIG. 2, there is shown a schematic drawing of a dosing dispenser in accordance with the present invention. The dispenser 10 includes an enclosure 11 having an internal cavity 12 for containing a solid, water soluble cleaning material 14 such as a cleaning agent. The enclosure may be made from rigid walls, but in the preferred embodiment has flexible walls 16.

Walls 16 are sealed along an upper edge 18, a lower edge 20, a right side edge 22 and a left side edge 24. The left side edge 24 is provided with a top or upper opening or hole 26, opening into the cavity 12 at an upper end of the edge 24, and a bottom opening 28, opening into the cavity 12 at a lower end of the edge 24. The openings 26 and 28 provide the only fluid communication between the cavity 12 and the exterior of the enclosure 11.

The dispenser may be suspended in a toilet tank as by a wire tie 30 which may be inserted through a hole 32 in a sealed portion 34 of the dispenser above the top edge 18 of the enclosure 11.

The top opening 26 communicates with the exterior of the dispenser through an air inflow and outflow passage 36 which extends from the top opening 26 downward to a vent or vent opening 38. The bottom opening 28 communicates with the exterior of the dispenser through a water inflow and solution outflow passage 40 extending upwardly from the bottom opening 28 to an inflow and outflow opening or orifice 42 located below the vent opening 38. Passages 36 and 40 may suitably be formed as portions of a continuous vertically extending channel 44 extending continuously from the top opening 26 to the bottom opening 28 along the edge 24, with the vent opening 38 and inflow and outflow opening 42 being formed in the channel 44.

In use, the dispenser is suspended in a toilet tank with the wire tie 30 so that the quiescent water level designated by the reference numeral 46 in FIG. 2, is above the vent opening 38. Tank water will automatically flow in the direction of arrow 48 into the inflow and outflow orifice 42, through the passage 40 and into the cavity 12 through the bottom opening 28 to fill the cavity 12 up to the level 50. As the cavity 12 is being filled with tank water, excess air will be expelled through top opening 26, flow downward through passage 36 and bubble out of vent opening 38.

The initial water level 50 within the cavity 12 is aligned with the vent opening 38 since the pressure of the air trapped above the level 50 is equalized with the tank water at its interface therewith at the vent opening 38, and therefore, since the water on opposite sides of the bottom opening 28 has the same density, the water pressure on opposite sides of the bottom opening 28 are equal and thus the water inside and outside the cavity 12 are in equilibrium and further flow into the cavity 12 ceases when the water level 50 is reached.

Thus, once the dispenser has been suspended in the toilet tank and the water in the cavity 12 has reached an equilibrium level 50, air fills the air inflow and outflow passage 36 and water fills the water inflow and solution outflow passage 40 and fills the cavity 12 up to the level 50 so as to submerge the block of cleaning material 14 therein and immediately begins to dissolve the cleaning material to form a cleaning solution in the cavity 12.

When the toilet is flushed, the tank water line drops below its quiescent level 46, allowing the cleaning solution inside the cavity 12 to flow through the bottom opening 28, up the water inflow and solution outflow passage 40 and into the tank through the inflow and outflow opening 42. However, the solution will continue to flow out of the dispenser only until its upper level drops to the level of the inflow and outflow opening 42. Thus, the solid block of soluble cleaning material 14 will remain submerged in the solution inside cavity 12.

This inflow of tank water and outflow of solution each time the tank water level drops and then rises when the toilet is flushed is repeated with each flush of the toilet.

As noted above, when the dispenser is freshly placed in the toilet tank, the distance, or cavity volume, between the vent opening 38 and the inflow and outflow opening 42 determines the amount of cleaning solution which will be emitted from the dispenser each time the toilet is flushed. This dependency becomes somewhat more complicated as the block of soluble cleaning material continues to dissolve into the solution within the cavity 12 to increase the concentration of the dissolved material therein as explained below.

An appreciation of the effect of changing concentration of cleaning material in the solution within the cavity 12 is perhaps best understood by considering the passage 40 and the portion of the cavity 12 below the vent opening 38 as a "U" tube in which the head pressure of the tank water in one side of the "U" balances the solution on the other side, and by considering the passage 36 and the portion of the cavity 12 above the vent opening 38 as an "inverted U" tube through which air is displaced from the cavity 12 as fresh tank water is added to raise the solution level from the lower level 52 to the upper level 50.

Assuming that a block of calcium hypochlorite is utilized for the cleaning material, during the first few hours after placing a new dispenser in a toilet tank, the concentration of chlorine in solution in the cavity 12 is very low, and the specific gravity of the solution and the tank water is almost identical. Under these conditions, there is equal head pressure (weight) in both sides of the "U" tube and the cavity volume between the levels of the inflow and outflow opening 42 and the vent opening 38 will completely refill with each flush of the toilet. However, as time passes, and chlorine begins to saturate the solution in the cavity 12, the specific gravity of the solution increases, and less solution in the cavity 12 is required to balance the tank water head pressure. Under these conditions, during a refill of the cavity 12, the tank water head pressure is not sufficient to completely push the heavier cleaning solution in the cavity 12 to the level of the vent opening 38 before the tank water passes vent opening 38 and stops flow into the cavity 12. This occurs because, as indicated above, when the level of the tank water is above the vent opening 38, air in the "inverted U" tube is compressed by and is at the same pressure as the tank water at the vent opening 38, this pressured air preventing further inflow of tank water via the "U" tube.

Figure 3:
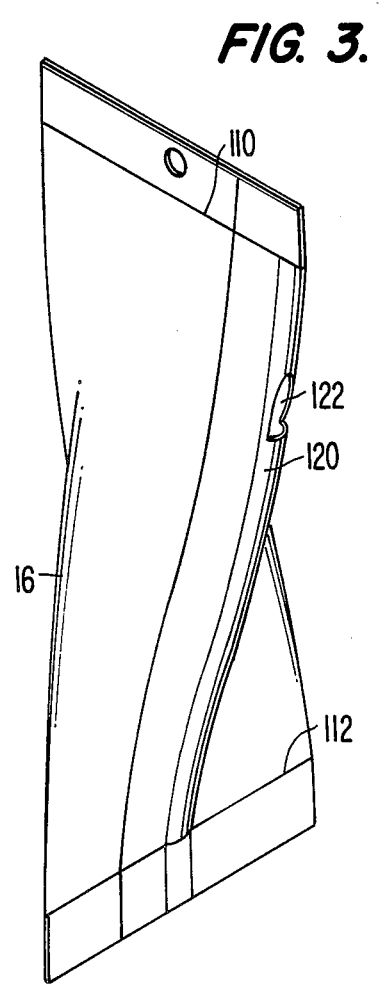
FIG. 3 is a perspective view of a dosing dispenser in accordance with a preferred structural embodiment of the invention.

Referring now to FIGS. 3, 4, 5 and 6, a specific preferred embodiment of the dosing dispenser and of a method of manufacture thereof in accordance with the present invention are illustrated. The dispenser body in accordance with this embodiment is formed from a flexible material, such a high-density polyethylene. The dispenser is formed from a rectangular sheet 100, illustrated in FIG. 6, having a top edge 102, a bottom edge 104, and side edges 106 and 108. The sheet 100 is rolled into a cylindrical shape such that the side edges 106 and 108 overlap and the now circular top and bottom edges 102 and 104 are pinched and sealed at right angles to each other so as to form a top sealed edge 110 and a bottom sealed edge 112, bottom sealed edge 112 extending perpendicularly to the top sealed edge 110 as shown in FIG. 3. The portion 114 of the sheet 100 along the left side edge 106 overlaps the portion 116 of the sheet 100 along the right side edge 108 to the outside thereof and is preformed to define a vertically extending channel 120 between the two overlapping portions 114 and 116, as best shown in FIG. 5. Also, the holes in the sheet 100 are positioned in the side portions 114 and 116 so as to open into the channel 120. In particular, a triangularly shaped hole 122 is cut in the sheet portion 114 so as to define a composite opening corresponding to the vent opening 38 and inflow and outflow opening 42 defined in schematic drawing of FIG. 2, and holes 124 and 126 are formed in the sheet portion 116 so as to respectively define a top opening and a bottom opening corresponding to openings 26 and 28 illustrated in schematic drawing FIG. 2.

Referring to FIG. 4, it can be seen that the portion of the channel 120 between the bottom edge of hole 122 and hole 126 forms a water inflow and solution outflow passage corresponding to passage 40 in schematic FIG. 2, and the portion of channel 120 between the upper edge of hole 122 and the top hole 124 defines an air inflow and outflow passage corresponding to passage 36 illustrated in schematic FIG. 2.

The overlapping parts of sheet portions 114 and 116 to either side of channel 120 are suitably heat sealed together.

Figure 12:
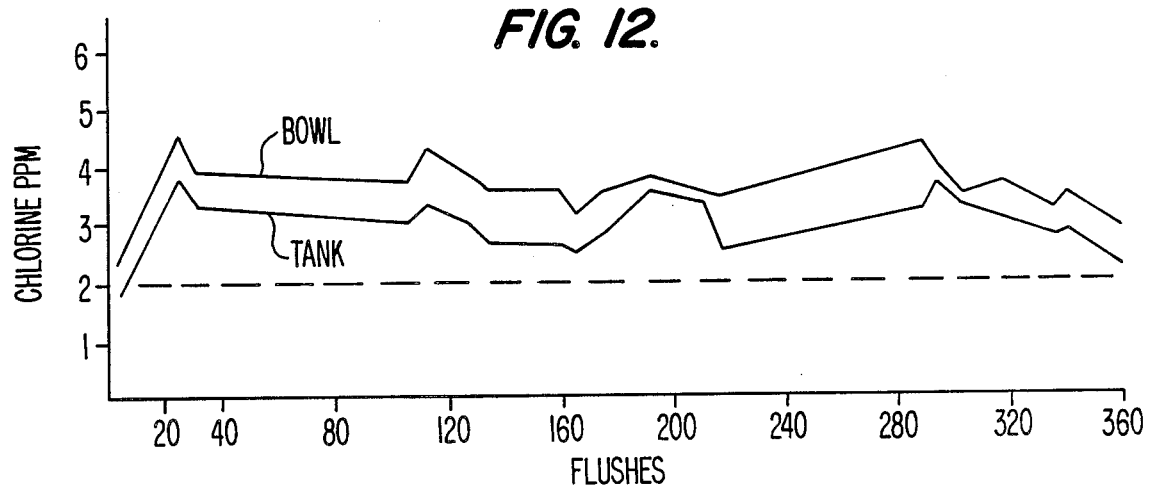
FIG. 12 is a graph illustrating toilet tank and toilet bowl hypochlorite concentration over the lifetime of a dispenser in accordance with the structural embodiment illustrated in FIGS. 3-5.

Prior to heat sealing both of the top and bottom edges of the dispenser, a block of soluble cleaner material must be inserted in the central portion of the dispenser defining the cavity 12. The inventor has is found that if the diameter of the cavity 12 is 1.62 inches, the height of the hole 122 is 9/16 inch, the distance from the sealed edge 112 to the bottom of the hole 122 is 4 inches, the volume of the cavity below the hole 122 is 92 milliliters, and a 1½ ounce block of calcium hypochlorite cleaning material is inserted in the cavity 12, then the dispenser will dispense sufficient calcium hypochlorite to the 1½ gallons of water in a standard toilet bowl during each of 350 flushes of the toilet over a 30 day period so that the concentration of hypochlorite ions in the bowl water will consistantly be between 3 and 4½ parts per million over the 30 day period. This same test produced a concentration of between 2 and 4 parts per million in the standard 4½ gallons of water in the toilet tank over the 30 day life of the dispenser. The results of this test are illustrated in FIG. 12 of the drawings.

When the tested dispenser was first placed in the toilet tank, the initial flushes resulted in a dispensing of 14 ml. of solution representing the volume of the cavity between the upper and lower edges of the hole 122. However, after a few hours of operation, the output volume of solution from the cavity 12 decreased until ultimately, the output volume dropped to less than 2 ml. as the reservoir of solution became fully saturated with the hypochlorite ions. As indicated above, this adjustment in the volume output automatically limits the total chlorine output to a narrow range thereby maintaining the concentration of ions in the tank and bowl to a similarly narrow range, as reflected in the test results illustrated in FIG. 12.

In a dispenser to be sold commercially, it is important that the solid block of cleaning material such as calcium hypochlorite be protected from humidity during storage and prior to initial use. Accordingly, hole 122 defining the vent opening 38 and inflow and outflow opening 42 should be sealed as by a small stick-on tab which can be easily torn off prior to use, or the location of the hole 122 may be marked so that it may be cut by the user just prior to the dispenser being inserted in the toilet tank.

The inventor also found that although the water in the toilet tank is in constant liquid communication with the interior of the cavity 12 and therefore some hypochlorite ions will continuously migrate into the tank via the passage 40, the total migration into the tank in this manner can be kept insubstantial over the 30 day lifetime of the dispenser by suitably limiting the cross-sectional area of the water inflow and solution outflow passage 40. For example, such migration can be kept to a suitable minimum by limiting this cross-sectional area to about 0.15 square inch.

Another embodiment of the dosing dispenser of the invention is illustrated in FIG. 7. This embodiment is substantially identical to that of the prior embodiment except that the lower hole 126 is replaced by a plurality of inflow and outflow holes 130 whose size and spacing are defined to match the disbursing needs of the particular cleaning material. This embodiment may be manufactured by the same method as described above for manufacturing the prior embodiment. The inventor has found that a pattern of holes whose diameter increase in the downward direction along which they are aligned with decreasing distances between the holes in the downward direction works well for several cleaning agent surfactants tested. With such a pattern, most of the flow in and out of the cavity 12 tends to be through the lower, larger diameter and more closely spaced holes. This multiple hole approach works particularly well if the surfactant material is of a type which disintegrates and settles to the bottom of the cavity and thereby temporarily plugs up some of the bottom holes. In this condition, the majority of fresh water flowing into the dispenser unit tends to wash through the lowest open hole, and thus, over (and mixing with) the surfactant material directly under that hole. As the surfactant material is depleted, lower output holes are progressively opened and the fresh water flow moves progressively lower in the unit to follow the declining surfactant level.

FIGS. 8 and 9 illustrate additional structural and method embodiments of the invention. These embodiments differ from the embodiments illustrated in FIGS. 3–6 primarily in that the cavity 12 is formed by heat sealing together front and rear sections 152 and 154 along fins or flanges 156 and 158 respectively thereof. A U-shaped channel section 160 is heat sealed by flanges thereof onto the front section 154 so as to cover a top hole 162 and a bottom hole 164 vertically aligned in the front section 152, holes 162 and 164 respectively corresponding to the top opening 26 and the bottom opening 28 schematically illustrated in FIG. 2. Channel section 160 has a vertically elongated hole 166 therein vertically disposed between holes 162 and 164 so as to correspond to the vent opening 38 and inflow and outflow opening 42 schematically illustrated in FIG. 2. The composite structure of the dosing dispenser of this embodiment is similar in appearance and substantially identical in operation to that of the previously described embodiment illustrated in FIGS. 3–5. This embodiment, however, is particularly suited for manufacture with horizontal fin seal production equipment.

Figure 10:
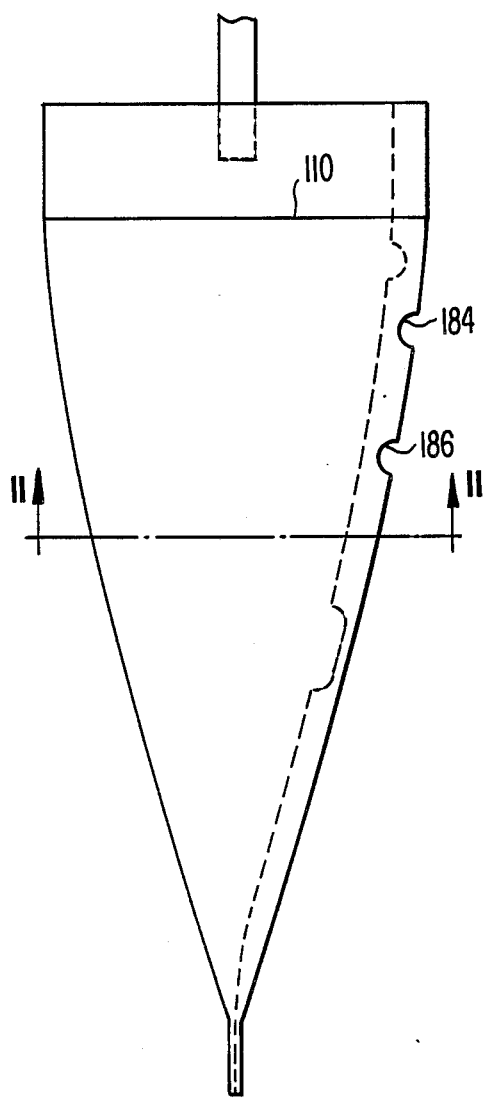
FIG. 10 is an elevational view of a fourth structural embodiment of the invention.
Figure 11:
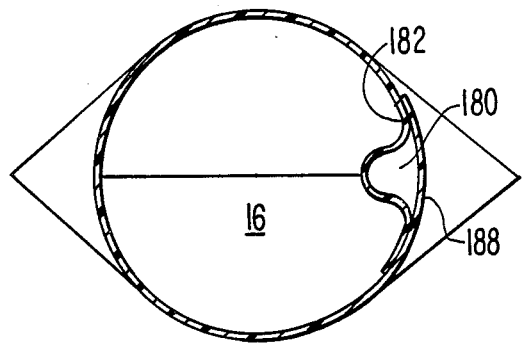
FIG. 11 is a cross sectional view taken along lines 11—11 in FIG. 10.

FIGS. 10 and 11 illustrate a further structural embodiment of the invention. This embodiment is similar to the embodiment illustrated in FIGS. 3–5 and differs therefrom only in that the channel which defines the passageways between the bottom opening 28 and inflow and outflow opening 42, and between the top opening 26 and the vent opening 38 as schematically illustrated in FIG. 2, is formed in the inside lapped portion 182 rather than in the outside lapped portion 114 as in the embodiment of FIGS. 3–5. Thus, the inside lapped portion 182 is formed to project inward of the cavity 12. This embodiment also differs from the embodiment of FIGS. 3–5 in that the vent opening and inflow and outflow opening are formed by separately and spaced apart holes 184 and 186 in the outer lapped portion 188 opposing the channel 180. As with the embodiment of FIGS. 3 and 5, the dispenser is formed from a single rectangular sheet having holes preformed therein similarly to that shown in FIG. 6, and the sheet is suitably formed and sealed to produce the structure illustrated in FIGS. 10 and 11 in a manner similar to that described above for the manufacture of the embodiment of FIGS. 3–5.

While particular embodiments of the invention have been illustrated and described, it will be obvious to those skilled in the art that various changes and modifications can be made without departing from the spirit and scope of the invention. The appended claims are intended to cover all such embodiments within the scope of the invention. For example, while the dispensers in accordance with the preferred embodiments of the invention are formed from a flexible sheet material, the dispensers could also suitably be formed from rigid members in which the required cavity and flow passages are molded or otherwise so formed as to achieve the self-regulated output taught by the invention.

What is claimed is:

1. A dosing dispenser for immersion in a body of water whose level can be raised and lowered between an upper level and a lower level, comprising:

an enclosure having an internal cavity for containing a solid, water soluble material, said enclosure having a closed sealed bottom, a closed sealed top above said bottom, and side walls extending upward from said bottom to said top, enclosing said cavity;

means, including a water inflow and solution outflow passage having at respective ends thereof a first opening opening into said cavity through said side walls at a first vertical level below said top, and a second opening opening exteriorly of the dispenser at a second vertical level below said top and above said first opening, for guiding water from the body of water into said cavity through said first and second openings when the level of the body of water rises from the lower level to the upper level and for guiding solution from the enclosure into the body of water when the level of the body of water falls from the upper level to the lower level, when the dispenser is disposed in the body of water such that the upper level is above said second opening and the lower level is below said second opening; and means, including an air inflow and outflow passage having at respective ends thereof a third opening opening exteriorly of said dispenser at a third vertical level below said top and above said second opening, and a fourth opening opening into said cavity through said side walls at a fourth vertical level above said third opening, for guiding air from the exterior of the dispenser into said cavity through said third and fourth openings when the level of the body of water falls from the upper level to the lower level, and for guiding air from the cavity to the exterior of the dispenser when the level of the body of water rises from the lower level to the upper level, when the dispenser is disposed in the body of water suoh that the upper level is above said second opening and the lower level is below said second opening;

said side walls being sealed against fluid flow between said cavity and the exterior of the dispenser through the portion of said side walls between said second level and said fourth level and through the portion of said side walls between said fourth level and said top.

2. A dosing dispenser as in claim 1, further comprising a quantity of solid, water soluble sanitizer material in said cavity.

3. A dosing dispenser as in claim 2, wherein said side walls, said top, said bottom, said air inflow and outflow passage and said water inflow and sollution outflow passage are formed of a single flexible sheet having first, second, third and fourth holes therein respectively defining the first, second, third and fourth openings, said sheet having a top edge, a bottom edge and opposite first and second side edgs connecting opposite ends of said top and bottom edges, said top edge being folded over itself and sealed so as to extend in a first horizontal direction and form said closed sealed top, said bottom edge being folded over itself and sealed so as to extend in a second horizontal direction perpendicular to said first horizontal direction and form said closed sealed bottom, said first side edge and said second side edge respectively ovelapping said second side edge and said first side edge and respectively sealed to respective sealed surface areas of the sheet spaced from and adjacent to said second side edge and said first side edge so as to define a channel between opposing first and second exposed overlapping surface areas of said sheet respectively between said first side edge and said first sealed surface area, and said second side edge and said second sealed surface area, said first edge being disposed inside said second edge, said first and fourth openings being formed in said first exposed surface area, said second and third openings being formed in said second exposed surface area, so that the portion of said channel between said first and second openings defines said water inflow and solution outflow passage and the portion of said channel between said third and fourth openings defines said air inflow and outflow passage.

4. A dosing dispenser as in claim 3, wherein said second and third openings share a common edge therebetween and define a common vertically elongated hole extending from said second vertical level to said third vertical level.

5. A dosing dispenser as in claim 1, wherein said enclosure has said first and fourth openings formed therein in vertical alignment, said means for guiding air and said means for guiding water and guiding solution comprising a channel member fixed to said enclosure and covering said first and fourth openings and defining a channel between said enclosure and said channel member communicating with said first and fourth openings, said channel member having said second and third openings therein so that the portion of said channel between said first and second openings defines said water inflow and solution outflow passage and the portion of said channel between said third and fourth openings defines said air inflow and outflow passage.

6. A dosing dispenser for immersion in a body of water whose level can be raised and lowered between an upper level and a lower level, comprising:

an enclosure having an internal cavity for containing a quantity of water and a quantity of a solid, water soluble material of a type which, when dissolved in water, increases the specific gravity of the resulting solution in proportion to the concentration of the material in the solution;

means for fixing said enclosure in a body of water at a predetermined position with respect to an upper level thereof; and means, connected to said enclosure and responsive to at least one of lowering and raising of the level of the body of water between the upper and lower level, for dispensing to the body of water a dose of a solution of water and a quantity of the water soluble material dissolved therein from said cavity, and drawing a quantity of water from the body of water into said cavity, when said enclosure is fixed in the body of water by said fixing means with the quantity of water soluble material contained in said cavity, said dispensing and drawing means including volume decreasing means for decreasing the volume of the dose in proportion to the concentration of the water soluble material dissolved therein.

7. A dosing dispenser as in claim 6, wherein said varying means includes level lowering means for lowering the level of a solution in the cavity when the body of water is at the upper level in proportion to the concentration of water soluble material dissolved therein and means for controlling the volume of the dose in proportion to the level of the solution.

8. A dosing dispenser as in claim 7, wherein said cavity has an upper end portion in the cavity, said level lowering means including means for sealing the volume of said upper end portion so as to trap air in said upper end portion under pressure to thereby limit the upward movement of the level of the solution in the cavity while water is being drawn into said cavity by said dispensing and drawing means.

9. A dosing dispenser for immersion in a body of water whose level can be raised and lowered between an upper level and a lower level, comprising:

an enclosure having an internal cavity for containing a solid, water soluble material, said enclosure having a closed sealed bottom, a closed sealed top above said bottom, and side walls extending upward from said bottom to said top, enclosing said cavity;

means, including a water inflow and solution outflow passage having at respective ends thereof a first opening means opening into said cavity through said side walls at a first vertical level below said top, and a second opening means opening exteriorly of the dispenser at a second vertical level below said top and above said first opening means, for guiding water from the body of water into said cavity through said first and second opening means when the level of the body of water rises from the lower level to the upper level and for guiding solution from the enclosure into the body of water when the level of the body of water falls from the upper level to the lower level, when the dispenser is disposed in the body of water such that the upper level is above said second opening means and the lower level is below said second opening means; and means, including an air inflow and outflow passage having at respective ends thereof a third opening means opening exteriorly of said dispenser at a third vertical level below said top and above said second opening means, and a fourth opening means opening into said cavity through said side walls at a fourth vertical level above said third opening means, for guiding air from the exterior of the dispenser into said cavity through said third and fourth opening means when the level of the body of water falls from the upper level to the lower level, and for guiding air from the cavity to the exterior of the dispenser when the level of the body of water rises from the lower level to the upper level, when the dispener is disposed in the body of water such that the upper level is above said second opening means and the lower level is below said second opening means;

said side walls being sealed against fluid flow between said cavity and the exterior of the dispenser through the portion of said side walls between said second level and said fourth level and through the portion of said side walls between said fourth level and said top;

said enclosure having said first and fourth opening means formed therein in vertical alignment, said means for guiding air and said means for guiding water and guiding solution comprising a channel member fixed to said enclosure and covering said first and fourth opening means and defining a channel between said enclosure and said channel member commmunicating with said first and fourth opening means, said channel member having said second and third opening means therein so that the portion of said channel between said first and second opening means defines said water inflow and solution outflow passage and the portion of said channel between said third and fourth opening means defines said air inflow and outflow passage, said first opening means including a plurality of spaced, vertically aligned holes in said enclosure.

10. A dosing dispenser as in claim 9, wherein said holes are of successively decreasing cross-sectional area in an upward direction.

11. A dosing dispenser for immersion in a body of water whose level can be raised and lowered between an upper level and a lower level, comprising:

an enclosure having an interval cavity for containing a solid, water soluble material, said enclosure having a bottom, a top above said bottom, and side walls extending upward from said bottom to said top, enclosing said cavity;

means, including a water inflow and solution outflow passage having at respective ends thereof a first opening opening into said cavity at a first vertical level below said top, and a second opening opening exteriorly of the dispenser at a second vertical level below said top and above said first opening, for guiding water from the body of water into said cavity through said first and second openings when the level of the body of water rises from the lower level to the upper level and for guiding solution from the enclosure into the body of water when the level of the body of water falls from the upper level to the lower level, when the dispenser is disposed in the body of water such that the upper level is above said second opening and the lower level is below said second opening and the lower level is below said second opening; and means, including an air inflow and outflow passage having at respective ends thereof a third opening opening exteriorly of said dispenser at a third vertical level below said top and above said second opening, and a fourth opening opening into said cavity at a fourth vertical level above said third opening, for guiding air from the exterior of the dispenser into said cavity through said third and fourth openings when the level of the body of water falls from the upper level to the lower lever, and for guiding air from the cavity to the exterior of the dispenser when the level of the body of water rises from the lower level to the upper level, when the dispenser is disposed in the body of water such that the upper level is above said second opening and the lower level is below said second opening;

said side walls, said top and said bottom comprising means for sealing said cavity against fluid flow between said cavity and the exterior of said enclosure except through said first and second openings via said water inflow and solution outflow passage and through said third and fourth openings via said air inflow and outflow passage.

* * * * *